G. B. WILLIAMS.

RELEASING ATTACHMENT FOR AIR BRAKES.

No. 11,124. Reissued Nov. 18, 1890.

WITNESSES:

J. A. C. Criswell

C. Sedgwick

INVENTOR:

G. B. Williams

BY Munn & Co.

ATTORNEYS

UNITED STATES PATENT OFFICE.

GEORGE BAYLEY WILLIAMS, OF PORTLAND, OREGON.

RELEASING ATTACHMENT FOR AIR-BRAKES.

SPECIFICATION forming part of Reissued Letters Patent No. 11,124, dated November 18, 1890.

Original No. 431,304, dated July 1, 1890. Application for reissue filed September 11, 1890. Serial No. 364,693.

*To all whom it may concern:*

Be it known that I, GEORGE BAYLEY WILLIAMS, of Portland, in the county of Multnomah and State of Oregon, have invented a new and Improved Releasing Attachment for Air-Brakes, of which the following is a full, clear, and exact description.

The invention relates to automatic air-brakes of the Westinghouse or other systems; and the object of the invention is to provide certain new and useful attachments for air-brakes for automatically effecting a rapid and immediate equalization of the air-pressure in the auxiliary reservoir and the train-pipe coincidently with and through the action of the increase of pressure in the train-pipe, which is caused by the engineer for the purpose of releasing the brake.

The invention consists in an improved construction and arrangement of parts connected with the triple valve and train-pipe and governing the discharge-passage from the auxiliary reservoir to said pipe, as hereinafter described.

Reference is to be had to the accompanying drawings, forming a part of this specification, in which similar letters and figures of reference indicate corresponding parts in both the figures.

Figure 1:
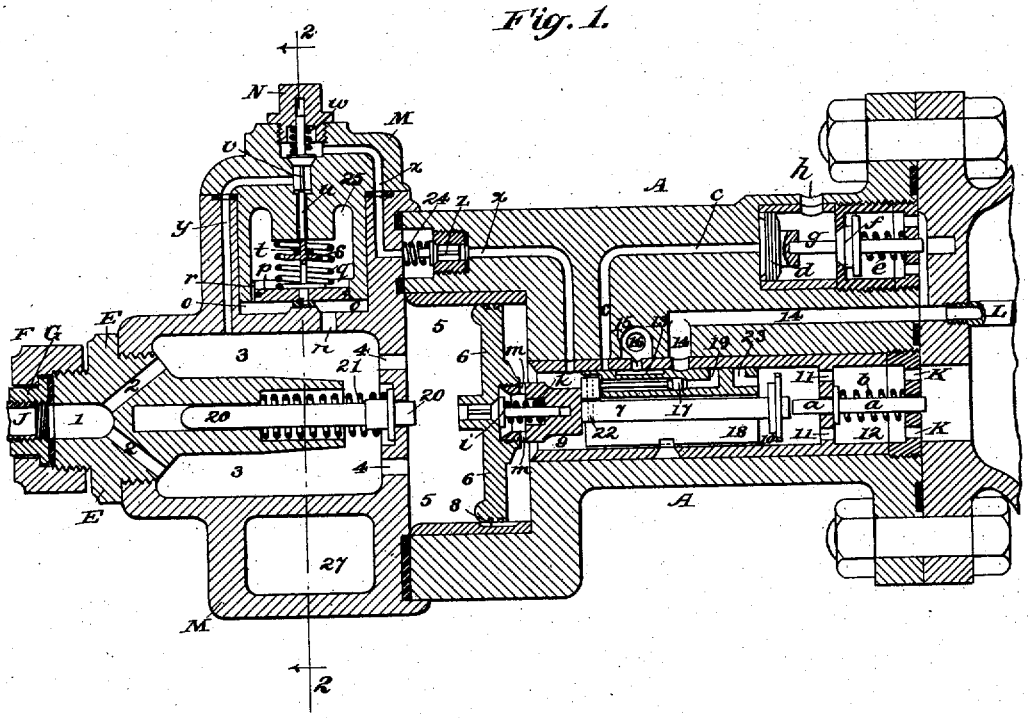
Figure 2:
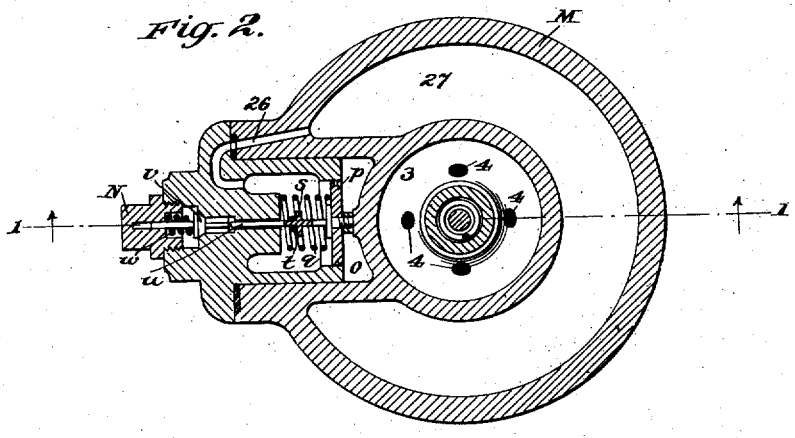

Figure 1 is a sectional side elevation of the improvement as applied to a triple valve on the line 1 1, Fig. 2; and Fig. 2 is a sectional plan view of the same on the line 2 2 of Fig. 1.

My invention is not shown as applied in connection with any quick-acting triple valve for automatic brake mechanisms, because all quick-acting triple valves do not require its use after emergency stops. Its essential use, in connection with any automatic air-brake, is illustrated and hereinafter more fully explained.

During an emergency application of the brakes the release of the latter is sometimes obstructed by a preponderance of pressure in the auxiliary reservoir, owing to a defect in the braking mechanism. My improvement is designed and adapted to overcome such obstruction, as hereinafter described.

A indicates the triple-valve case, which is adapted to be fastened to the auxiliary reservoir by means of bolts, and to have communication with the auxiliary reservoir and brake-cylinder, respectively, as in the Westinghouse "single-structure" freight-brake.

E is the nipple, from which connection is made with branch pipe J (leading to main air-pipe or train-pipe) by means of union-nut F and sleeve G, into which latter the said branch pipe is screwed. At J, K, and L connections are made with the train-pipe, the auxiliary reservoir, and the brake-cylinder, respectively.

The number 18 indicates the well-known piston or slide valve of the Westinghouse automatic air-brake. 6 indicates its controlling-piston; 7, the piston-stem; 8, the feed-groove; 17, the graduating-piston fastened to stem 7 by means of a pin 22.

19 and 23 are the application outlets; 14, the passage leading to the brake-cylinder; 20, the graduating-stem; 21, the graduating-spring; 13, the exhaust-groove; 15, the exhaust-port, and 16 the exhaust-outlet. These ports are adapted to perform the same functions in the application and release of the brakes as in the Westinghouse automatic air-brake.

The inward travel of the piston 6 is initially checked by a release graduating-stem *a*, which is encircled by a spring *b*. The stem 7 of piston 6 is chambered at its forward end to form a passage between the train-pipe and auxiliary reservoir, and such chamber has an auxiliary feed-valve *i*, spring *k*, and lateral opening *m*, by which the compressed air from the main air-pipe can pass into the auxiliary reservoir when the piston 6 is at the inner limit of its travel.

Other devices for aiding in releasing the brakes with certainty and rapidity consist of the passage *c*, piston *d*, spring *e*, piston-valve *f*, and exhaust-outlet *h*. The said valve *f* governs an auxiliary communication between the brake-cylinder and the atmosphere.

In the operation of the triple valve to which my improvement is shown to be applied air from the main reservoir and the train-pipe passes through the passages 1 2, chamber 3, and passage or passages 4 into the piston-chamber 5, forcing the piston 6 inward till it meets with resistance from the spring *b*, at which time the feed-groove 8 will be uncovered and the compressed air will pass through the same into the slide-valve chamber 9, which is at all times in communication with the auxiliary reservoir through the passages 10, 11, 12, and K. It being desired to apply the brakes, the engineer will open his brake-valve and allow the pressure in train-pipe to become reduced by part of the same being vented into the atmosphere, afterward closing the valve. As a result of such reduction of pressure in the train-pipe, the preponderance of pressure in the auxiliary reservoir will force piston 6 outward, closing feed-groove 8 and opening graduating-valve 17, thus allowing the auxiliary-reservoir pressure to enter passage 19 in slide-valve 18. A further outward movement of piston 6 and slide-valve 18 will cause the exhaust-groove 13 in face of slide-valve 18 to register with passage *c* and with exhaust-port 15, so as to allow any compressed air actuating auxiliary piston *d* to escape to the atmosphere through exhaust-outlet 16, when the expansion of spring *e* will force the piston *d* outward and seat valve *f*, which governs the auxiliary exhaust from the brake-cylinder to the atmosphere from passage or passages L through exhaust-outlet *h*. A still further outward movement of slide-valve 18 will cause the passage 19 to register with the passage 14, through which compressed air will pass from the auxiliary reservoir to the brake-cylinder and cause the application of the brakes, during which time the graduating-stem 20 will be forced outward and its spring 21 compressed by the outward movement of piston 6. When the pressure in the auxiliary reservoir has been reduced by expansion into the brake-cylinder to nearly an equality with the pressure in the train-pipe, the graduating-spring 21 will expand, forcing piston 6 inward till graduating-stem 20 reaches its seat, and closing graduating-valve 17, thus preventing a greater application of the brakes. If it is desired to apply the brakes with still greater force, the operation can be repeated, thus allowing a still greater air-pressure to pass from the auxiliary reservoir to the brake-cylinder.

It being desired to recharge the auxiliary reservoir without releasing the brakes, the pressure in train-pipe must be increased slowly in order to force piston 6 inward till it meets with resistance from the spring *b*, but without compressing spring *b* to any appreciable extent. The feed-groove 8 will be uncovered, and the auxiliary reservoir can be gradually recharged to nearly its normal capacity, while spring *b* is expanded to its normal limit. It being desired to partially release the brakes, the pressure in the train-pipe is sufficiently increased to force piston 6 inward and partially compress spring *b*, thus causing the exhaust-groove 13 to register with exhaust-port 15 and with passage 14, and allowing the brake-cylinder pressure to pass to the atmosphere by passages 14, 13, 15, and 16. The engineer having closed his brake-valve and the increase of pressure in train-pipe having ceased, the pressure in train-pipe and auxiliary reservoir will quickly equalize through feed-groove 8, when spring *b* will expand and force piston 6 outward till exhaust-groove 13 no longer registers with passage 14, when the reduction of the air-pressure in the brake-cylinders will cease. It being desired to fully release the brakes, the pressure in the train-pipe is sufficiently increased to force piston 6 inward, so as to carry slide-valve 18 past and uncover passage *c*, through which the pressure in the auxiliary reservoir will pass to auxiliary piston *d*, forcing the same toward and unseating valve *f*, when the compressed air in brake-cylinder will be exhausted through passages L and *h*, resulting in the rapid and complete release of the brakes. When the piston 6 approaches closely to its inner seat for the complete release of the brakes, it is preferable that the feed-groove 8 shall be closed in order that the full pressure in the train-pipe may be exerted to carry piston 6 inward till slide-valve 18 passes by and uncovers passage *c*. After this has been done, any considerable preponderance of pressure in the train-pipe will force open valve *i*, compressing spring *k*, and part of it will then pass into the auxiliary reservoir through chamber *l* and passages *m*, after which the expansion of spring *b* will force piston 6 outward till stem *a* reaches its seat. The excess pressure retained in the train-pipe will help to insure the release of the brakes to the rear of the train and will then equalize with the pressure in the auxiliary reservoir through feed-groove 8, which is to be of suitable size for the purposes for which intended.

So far as the performance of its function in ordinary braking is concerned—that is to say, effecting the closure of communication between the train-pipe and the auxiliary reservoir and the opening of communication between the auxiliary reservoir and the brake-cylinder in applying the brakes, and the reverse operations in partly or wholly releasing the brakes, as well as recharging the auxiliary reservoir without releasing the brakes and temporarily retaining an excess pressure in the train-pipe when fully releasing the brakes—the triple valve, as shown, accords with that set forth in my application for Letters Patent, Serial No. 326,562, filed October 10, 1889, and is not, therefore, claimed as of my present invention, saving as to the structural features by which it performs the further function of insuring the release of the brakes, when desired, by causing the preponderance of pressure in the auxiliary reservoir to flow into the train-pipe coincidently with an increase of pressure in the train-pipe, as presently to be described. Certain of its elements will, however, be herein specified, in order to render its construction and operative relation to other members of the brake mechanism fully intelligible.

M represents an auxiliary cap closing the chamber in which the supplemental releasing-valve mechanism operates; N, a plug closing the relief-valve chamber; *n*, a passage leading from the drip-cup 3 into the piston-chamber *o*, through which the train-pipe pressure can actuate the auxiliary piston *p*; *q*, a spring holding piston *p* normally to the inner limit of its travel; *r*, a charging or feed groove through which air under pressure may pass from the train-pipe into chamber 25, which has constant communication with the supplemental reservoir 27 through passage 26; *s*, a collar on the piston-stem *u*; *t*, a packing-washer fitting on piston-stem *u* and resting against the outer side of collar *s*; *v*, a relief-valve held normally to its seat by the spring *w*; *x*, a passage leading from valve *v* to the auxiliary reservoir; *y*, a passage leading from the relief-valve *v* to the train-pipe; *z*, a check or retaining valve normally held to its seat by spring 24 and then closing passage *x*. As shown in Fig. 1, the passage *x* opens into the chamber of the slide-valve 18; but the opening is so located as to be not obstructed during the time the piston 6 is approaching its outer seat—that is, when it is acting against the graduating-stem 20 and compressing the spring 21. The opening of the passage *x* into the chamber of the slide-valve 18 may at other times be covered by the said valve 18, although it is not necessary on account of the check-valve *z*, which effectually guards the said passage *x*. It will be understood that the opening of the said passage *x* into the slide-valve chamber may be so located as to be entirely out of the path of the slide-valve, and thus be unaffected by the movements of said valve.

In case of any very considerable reduction of the train-pipe pressure, whether caused by an excessive and unnecessary exhausting of same to the atmosphere through the engineer's brake-valve, by such pressure being partly exhausted into the brake-cylinder during an emergency application of the brakes, by the use of the Westinghouse quick-acting triple valve, by the train-pipe being severed, or by any very considerable leakage therefrom, the result in all such cases alike is a considerable preponderance of pressure in the auxiliary reservoir over the pressure in the train-pipe, which forces the piston 6 firmly against its outer seat, compressing the graduating-spring 21 and obstructing the release of the brakes. To enable the brakes to be released this preponderance of pressure must be overcome either by sufficiently increasing the pressure in the train-pipe, by exhausting the preponderance of pressure into the atmosphere either directly or indirectly, or by exhausting the preponderance of pressure into the train-pipe either directly or indirectly. In my improvement provision is made for exhausting the preponderance of pressure in the auxilliary reservoir into the train-pipe coincidently with an increase of pressure in the train-pipe. The increase of pressure in the train-pipe, passing through passage *n* into the piston-chamber *o*, will force piston *p* outward, compressing its spring *q* till the collar *s* holds packing-washer *t* tightly to its seat, so as to prevent any leakage of compressed air from the auxiliary reservoir into chamber 25 and supplemental reservoir. The outward movement of piston *p* also forces its stem *u* against the release-valve *v*, unseating the latter and allowing any preponderance of air-pressure in the auxiliary reservoir to flow through passage *x* past check-valve *z* and relief-valve *v*, and through passage *y* into the train-pipe until the pressures in the auxiliary reservoir and train-pipe have equalized, when spring 24 will force check-valve *z* to its seat. As soon as there is a preponderance of pressure in the train-pipe, it will flow past relief-valve *v* into the passage *x*, where it merely assists the spring 24 in holding check-valve *z* tightly to its seat, and thus obstructs its own further advance. It will be seen that a preponderance of pressure in the train-pipe cannot pass into the auxiliary reservoir through passages *y* and *x*, because, though such preponderance of pressure may force open relief-valve *v*, there is no provision made for unseating check-valve *z* at the same time. The preponderance of pressure in the train-pipe will consequently be exerted against triple-valve piston 6, and, if sufficient, will force the piston 6 inward to position for opening the exhaust from the brake-cylinder and for releasing the brakes, at which time the pressures in the train-pipe and auxiliary reservoir will equalize. The pressure in the train-pipe, passing through passage *n*, chamber *o*, and feed-groove *r*, will also equalize with the pressure in the chamber 25 and supplemental reservoir 27, when the expansion of spring *q* will force piston *p* back to its normal position, as shown, and allow the relief-valve *v* to be seated by the pressure of its spring *w*, the air-pressures on both sides of relief-valve *v* being equal at this time.

Upon any reduction of pressure in the train-pipe the preponderance of pressure in the supplemental reservoir 27 and chamber 25 will assist the spring *q* in holding the piston *p* to its normal position at the inner limit of its travel, and thus allow the relief-valve *v* to remain seated.

It will be seen that compressed air can only pass from the auxiliary reservoir to the train-pipe when the relief-valve *v* is unseated by the outward movement of piston *p*, the preponderating pressure in the auxiliary reservoir at the same time unseating check-valve *z*; or, in other words, when there is a preponderance of pressure in the auxiliary reservoir, and then only coincidently with and through the increase of pressure in the train-pipe.

Change of form or modifications of structure, by means of which the functions of my improvement are performed in substantially the same way, are hereby included herein.

Having thus described my invention, I claim as new and desire to secure by Letters Patent—

1. A releasing attachment for air-brakes, comprising a supplemental valve mechanism for the triple valve, which is actuated by an increase of pressure in a train-pipe independently of the movement of main piston of triple valve, an auxiliary discharge-passage leading from the auxiliary reservoir to the train-pipe, which is governed by such supplemental valve mechanism, and also by a check-valve which prevents any return-flow of compressed air from train-pipe to auxiliary reservoir through such discharge-passage, substantially as shown and described.

2. The combination, with an auxiliary reservoir, a train-pipe, a triple valve containing a passage through which compressed air can flow only from the train-pipe into the auxiliary reservoir, and an auxiliary passage through which compressed air can flow only from the auxiliary reservoir into the train-pipe, of a supplemental valve mechanism actuated by an increase of pressure in the train-pipe independently of the movement of main piston of triple valve, which supplemental valve mechanism controls the said auxiliary discharge-passage, and a check-valve interposed in said auxiliary passage which prevents any return-flow of compressed air from the train-pipe into the auxiliary reservoir through said passage, substantially as shown and described.

3. In an automatic brake mechanism, the combination, with a triple valve, of a discharge-passage from an auxiliary reservoir to a train-pipe for any preponderance of air-pressure in the former, and a supplemental valve mechanism actuated by an increase of air-pressure in the train-pipe and controlling said discharge-passage for automatically effecting a rapid and immediate equalization of the air-pressures in the auxiliary reservoir and the train-pipe only coincidently with and through the action of the increase of pressure in the train-pipe, which is caused by the engineer for the purpose of releasing the brakes, said supplemental valve mechanism not allowing any preponderance of air-pressure to flow through said discharge-passage from the train-pipe to the auxiliary reservoir, substantially as shown and described.

4. In an automatic brake mechanism, the combination, with a triple valve having a passage through which air under pressure can pass from a train-pipe into an auxiliary reservoir, of an auxiliary passage through which air under pressure can only pass from an auxiliary reservoir to a train-pipe, a supplemental valve mechanism actuated by pressure from a train-pipe independently of the movement of main piston of triple valve and controlling said discharge-passage, and a check-valve interposed in said auxiliary passage, which prevents any return-flow of compressed air through said discharge-passage from the train-pipe to the auxiliary reservoir, substantially as shown and described.

5. In an automatic brake mechanism, the combination, with a triple valve, of an auxiliary piston which is subject to variations of pressure on its opposite sides, a spring-actuated relief-valve controlling a discharge-passage for air under pressure from an auxiliary reservoir to a train-pipe, which relief-valve is located in a position to be unseated by the outward movement of the auxiliary piston, and a spring-actuated check-valve located in said discharge-passage, so as not to allow any preponderance of air-pressure in the train-pipe to flow into the auxiliary reservoir, substantially as shown and described.

6. In an automatic brake mechanism, the combination, with a triple valve, of a relief-valve controlling a discharge-passage for air under pressure from an auxiliary reservoir to a train-pipe, a check-valve located in said discharge-passage for preventing any preponderance of air-pressure in the train-pipe from flowing into the auxiliary reservoir through said passage, an auxiliary piston-chamber, an auxiliary piston fixed on a stem and fitted to move in said chamber and to unseat the relief-valve during the outward movement of said auxiliary piston, a charging groove or passage establishing communication between the parts of the auxiliary piston-chamber on the opposite sides of the auxiliary piston, the inner part of which chamber communicates with a train-pipe, the increase of pressure in which moves the auxiliary piston outward and unseats the relief-valve, while the pressure in the outer part of which chamber which has passed from the train-pipe through the charging-groove will move the auxiliary piston inward to its normal position and allow the relief-valve to be seated whenever the pressure in the train-pipe is suddenly reduced, and the spring-pressure alone exerted against the outer side of the auxiliary piston will move the piston inward to its normal position and allow the relief-valve to be seated whenever the pressures have equalized on both sides of the auxiliary piston, substantially as shown and described.

7. In an automatic brake mechanism, the combination, with a triple valve, of a supplemental reservoir adjoining and exterior to the drain-cup of the triple valve, an auxiliary piston-chamber closed at its outer end and fitting an opening in the supplemental reservoir, an auxiliary piston fixed on a stem and fitted to move in said chamber, a port leading from the drain-cup to the auxiliary piston-chamber on the inner side of the auxiliary piston, a charging groove or passage leading from the chamber on the inner to the chamber on the outer side of the auxiliary piston, a port leading from the chamber on the outer side of the auxiliary piston to the supplemental reservoir, a relief-valve controlling a passage leading from the auxiliary reservoir to the train-pipe, which relief-valve is located in position to be unseated by the outward movement of the auxiliary piston, a discharge-passage from the auxiliary reservoir to the train-pipe, which is controlled by the relief-valve, and a check-valve located in the discharge-passage, which allows compressed air to pass from the auxiliary reservoir to the train-pipe when the relief-valve is unseated, but prevents any return flow of compressed air from the train-pipe to the auxiliary reservoir, substantially as shown and described.

8. In an automatic brake mechanism, an auxiliary cap having a closed top and adapted to be fixed upon a drain-cup, also having an internal auxiliary piston-chamber and an external valve-chamber, the latter being closed by a plug, the internal auxiliary piston-chamber having openings communicating with a train-pipe and a supplemental reservoir, respectively, and the external valve-chamber having openings adapted to communicate with an auxiliary reservoir and a train-pipe, respectively, substantially as shown and described.

GEORGE BAYLEY WILLIAMS.

Witnesses:

N. E. HANDSAKER,

HENRY G. WARREN.